United States Patent [19]

Fawley

[11] Patent Number: 5,289,942
[45] Date of Patent: Mar. 1, 1994

[54] REINFORCED STORAGE TANKS

[76] Inventor: Norman C. Fawley, 5701 Seaside Walk, Long Beach, Calif. 90803

[21] Appl. No.: 989,589

[22] Filed: Dec. 11, 1992

Related U.S. Application Data

[60] Division of Ser. No. 708,012, Jun. 3, 1991, Pat. No. 5,194,110, which is a continuation-in-part of Ser. No. 274,278, Nov. 21, 1988, abandoned.

[51] Int. Cl.⁵ .............................................. B65D 90/00
[52] U.S. Cl. .................................... 220/565; 220/4.12; 220/648; 52/248; 52/514
[58] Field of Search ............. 220/565, 589, 590, 4.12, 220/420, 646, 648; 52/514, 245, 248, 249

[56] References Cited

U.S. PATENT DOCUMENTS

| | | | |
|---|---|---|---|
| 883,288 | 10/1906 | Anderson | 220/565 X |
| 1,631,051 | 5/1927 | Nichols | 220/565 |
| 1,747,840 | 2/1930 | Patterson | 220/565 |
| 1,817,857 | 8/1931 | Trageser et al. | 220/4.12 |
| 1,940,785 | 12/1933 | Boardman | 220/565 |
| 2,237,308 | 4/1941 | Larson | 220/565 |
| 3,024,938 | 3/1962 | Watter | 220/4.12 |
| 3,240,644 | 3/1966 | Wolff | 220/590 X |
| 3,471,053 | 10/1969 | Endicott et al. | 220/4.12 X |
| 4,126,976 | 11/1978 | Crowley | 52/248 X |
| 4,308,967 | 1/1982 | Vater et al. | 52/248 X |
| 4,589,562 | 5/1986 | Fawley | 220/590 |
| 4,690,295 | 9/1987 | Wills | 220/590 |

Primary Examiner—Allan N. Shoap
Assistant Examiner—Stephen Cronin
Attorney, Agent, or Firm—Lane, Aitken & McCann

[57] ABSTRACT

A fluid storage tank made of a plurality of steel plates welded together is reinforced by winding a plurality of continuous, high tensile strength, non-metallic filaments around and in contact with the plates and applying a resin to the filaments to define a composite material of the filaments in a resin matrix. In one embodiment, substantially the entire exterior surface of the shell is covered by the composite material to form a reinforcing jacket. In another embodiment, the composite material is formed into a plurality of spaced reinforcing bands extending around the shell.

6 Claims, 2 Drawing Sheets

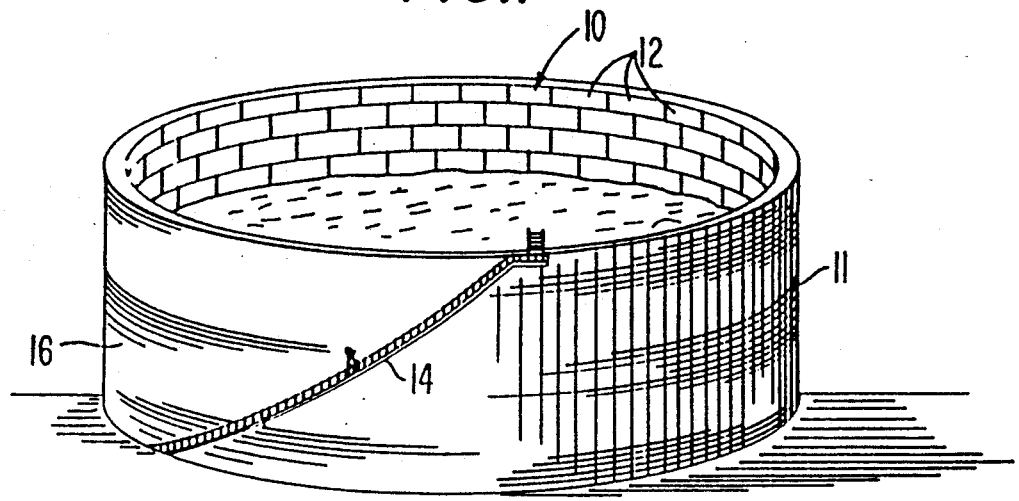
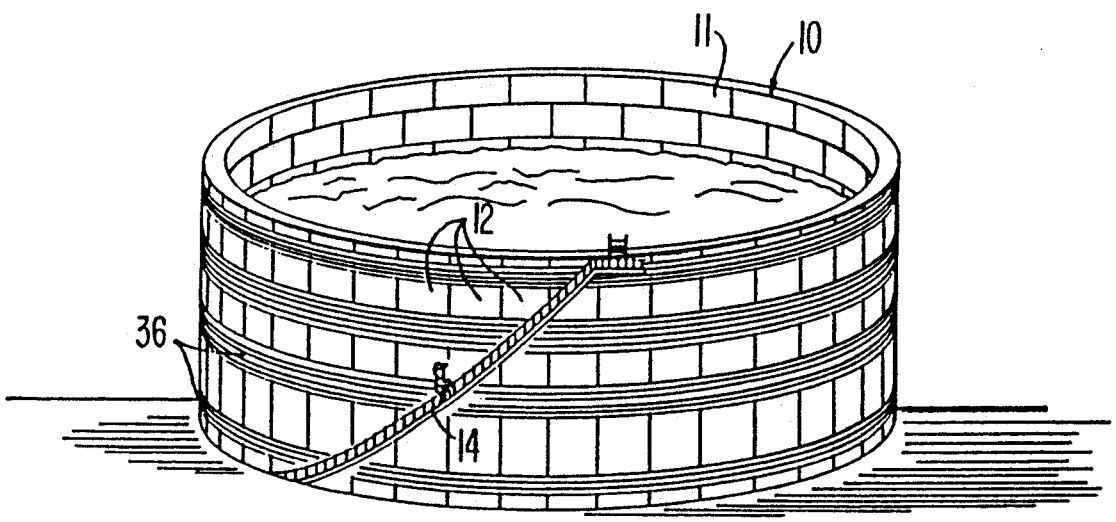

REINFORCED STORAGE TANKS

CROSS-REFERENCE TO RELATED APPLICATION

This is a division of Ser. No. 07/708,012, filed on Jun. 3, 1991, now U.S. Pat. No. 5,194,110 which is a continuation-in-part of Ser. No. 07/274,278, filed on Nov. 21, 1988, now abandoned.

BACKGROUND OF THE INVENTION

The present invention relates to large fluid storage tanks and, more particularly, to a method of preventing the bursting of storage tanks made of a material which is subject to failure under load by a rapidly propagating fracture. The present invention also relates to reinforced storage tanks produced in connection with the method.

In 1988, an oil storage tank in Floreffe, Pennsylvania near Pittsburgh burst, spilling about 3.8 million gallons of oil into the Monongahela River. The oil flowed down the Monongahela River and then down the Ohio River causing immense damage. The owner of the tank received more than 4,000 claims totalling $18,000,000 from individuals, businesses, and government agencies, and paid clean-up costs and provided drinking water or assistance to more than 17 communities along the rivers from Pittsburgh to Louisville, Ky.

The failure of the tank, which was made of steel and built in the 1940's was due to a dime-size flaw in the tank's steel shell, which was present when the tank was first erected. The fact that the flaw was near a weld caused the material near the flaw tip to become embrittled, and the embrittlement led to a fracture which rapidly propagated from the flaw to the top and the bottom of the tank, probably in less than one second. The embrittlement is believed to have been caused by the phenomenon of dynamic-strain-aging, but other factors can lead to the failure of a tank, such as thermal cycling from the change of seasons, load cycling from the filling and emptying of the tank, and corrosion. The bursting of the 48-foot high, 120 foot diameter tank was so sudden and so complete that: the weld joint attaching the tank shell to the bottom plates failed; the ruptured tank shell, propelled by the force of the gushing oil, moved over 100 feet in a direction opposite the rupture, taking the tank roof with it; and the oil stream hit an adjacent tank with such force that it dented the steel shell.

The failure of the tank has caused concern that other catastrophic failures could occur. The concern is not only that further pollution problems could arise, but that escaping flammable liquids could ignite, causing a tremendous explosion that could involve an entire tank farm. It is estimated that there are presently over 20,000 of these 1930's/1940's vintage liquid storage tanks on the navigable waterways of the United States. Because of its type and age, the steel used in these tanks is subject to embrittlement and rapidly propagating brittle fractures, especially at low temperatures. Thus, the tanks are subject not only to stresses imposed by the fluids contained, but also to additional stresses imposed by flaws in their shells. However, despite the fact that the damage caused by the bursting of one of these tanks is tremendous, the cost of replacing them or emptying and reconstructing them is so great that no extensive activity in replacing or reconstructing them has taken place.

In years since the 1940's, as an alternative to steel, it has been proposed that large storage tanks be constructed of helically-wound filamentary material which is either impregnated with an unpolymerized resin before winding or treated with a subsequently applied resin. An example of such a tank having a shell made only of a composite material of strands of glass fibers and a resin is disclosed in U.S. Pat. No. 2,808,097 to W. G. Martin. The tank is constructed using a mandrel comprising a plurality of arcuate plates which are removed when the forming of the storage structure has been completed. Another example of a shell made of resin and filaments is disclosed in U.S. Pat. No. 3,537,938 to H. R. Clements, wherein the shell includes several layers of resin or resin and filaments in various forms.

It has also been known to form large structures of a plurality of panels made of glass fiber reinforced plastic resin honeycomb bonded together at their abutting edges and to reinforce such structures with strands of filaments coated with the resin and wrapped around the structure, in order that the structure is strong enough to withstand the high radial forces which translate into hoop tension when the structures are used for storing liquids. Such structures, like that disclosed in U.S. Pat. No. 3,819,450 to Bernard P. Kunz, seek to obtain the strength of the conventional steel storage tank without the weight and cost which are associated with steel tanks.

Although proposals have been made to avoid the problems of steel storage tanks by constructing new tanks of composite material, such tanks have been designed merely to withstand the forces of the fluids in the tanks. Thus, the additional stresses due to flaws in materials have not been dealt with, and the problems of making thousands of existing steel tanks safe and constructing safer new tanks of steel have not been solved.

No effective or practical solution has been proposed for the problem of making aging steel storage tanks safe. Since the storage tanks comprise a large number of steel plates welded together, previous approaches to solving the problem of the deteriorating storage tanks have included from time to time, carefully inspecting the welds for defects and correcting any defects found, as well as inspecting the plates for corrosion, repairing any spots where corrosion is found, and, if the corrosion is serious, removing and replacing the particular plates affected. In some instances, repairs have been effected by securing patches over those areas exhibiting defects or flaws. To be successful, these approaches rely on the inspections to find the problems that exist and on the repairs to adequately correct the problems. This is for the reason that patches are only secured in those areas in which defects are found; thus, undetected flaws and defects remain as potential sources of problems.

Other approaches have involved proposals for avoiding the conditions which lead to the failure of storage tanks. In an article in the *Oil & Gas Journal* of Feb. 19, 1990, entitled "Brittle Fracture of Old Storage Tanks Can Be Prevented", a number of suggestions were made for avoiding such conditions. Since low temperatures lead to failures, it was suggested that external insulation be provided on the tank shell so that the liquid stored in the tank will keep the shell relatively warm. Since high stress at low temperatures can lead to tank failures, the article proposed limiting the fill height of tanks to less than 75 percent of the their shell height during winter conditions (for material having low toughness). The article further suggested determining any sources of shock loading of the tank shell and avoiding them if possible. Since high stress concentrations can lead to failure of the tanks, the article proposed water testing the tanks. In the case of oil storage tanks, because the specific gravity of the liquids to be stored are generally between 0.7 and 0.9, filling the tank with water will test the tank at a significant overload relative to its normal loading in service. The article disclosed that the overload has the beneficial effect of causing locations in the tank shell having high stress concentrations, such as at discontinuities or defects, to yield so that stress peaks are removed and crack tips blunted.

A drawback with water testing is that it must be carried out during warmer weather. It also requires that the tank be emptied of the liquid that it normally stores. A problem with limiting the fill height of the stored liquid in the tank to less than 75 percent of the shell height during winter conditions is, of course, that not as much liquid can be stored. All of the approaches seeking to avoid conditions which lead to the failure of storage tanks have the problem that the tanks are subject to failure if the measures taken are not successful in avoiding the conditions. Furthermore, the condition avoidance remedies such as providing an insulation and limiting fill height, are usually based on the worst conditions expected for a particular site. If conditions which occasionally occur, such as record cold snaps, happen at the tank site, the measures taken may not be adequate to avoid subjecting the tanks to failure.

SUMMARY OF THE INVENTION

By the present invention, a method is provided which greatly minimizes the possibility of catastrophic failure of storage tanks rather than to rely on the ability of inspections to find defects or repairs to adequately remedy the defects. Failure is prevented without regard to climatic conditions and without the need to monitor the tank to assure that countermeasures in avoiding certain climatic conditions, such as keeping the shell of the tank above a preselected temperature, are successful. In addition, the present invention overcomes the problem of susceptibility to bursting by treating the tank as a whole, rather than to correct deficiencies on a piecemeal basis. As a result, the method according to the present invention provides structural integrity for the tank.

In one embodiment, the method according to the present invention comprises forming a reinforcing jacket of the composite material on the existing tank shell, around the entire circumference of the tank for substantially the entire height of the tank. In another embodiment, the method involves forming one or more discrete reinforcing bands of the composite material around the entire circumference of the tank, wherein the bands are spaced along the height of the tank.

By the method of the present invention, thousands of existing steel fluid storage tanks, and other fluid storage tanks subject to bursting from a rapidly propagating fracture, can be treated so as to prevent the catastrophic bursting of the tanks. More specifically, a composite material of continuous high tensile strength, nonmetallic filaments in a resin matrix is wrapped around the exterior surface of the tanks. The jacket or wrapping of composite material around and in contact with the exterior surface of the plates forming the storage tank provides inherent strength by virtue of the hoop-like structure which is created, which in turn provides uniform, inwardly-directed forces tending to maintain the integrity of the storage tank when filled with fluid. Further, since the jacket or the wrapping of the composite material encompasses the circumference of the tank for substantially the entire height, it provides protection with respect to areas of weakness, and/or defects or flaws which might otherwise remain undetected. Moreover, the jacket or wrapping also aids in preventing a rapidly propagating fracture from initiating. In this regard, it is preferred that more composite material be used than is necessary merely to withstand the hoop stresses placed on the steel tank due to the hydrostatic or other forces of the fluid in the tank. Enough composite material is wound on the tank to reinforce the steel to withstand the hoop stresses imposed on the tank by the fluid and the additional stresses which will be imposed by any flaw in the steel. These additional stresses may in themselves be much greater than the stresses imposed by the fluid, and they combine with the stresses imposed by the fluid to place greater hoop stresses on the shell. Such benefits cannot be achieved with prior approaches involving the repair of defects with patches which are only secured over defects which have been detected or over areas of inherent weakness.

For most applications, including a tank of the size of the failed tank in Pennsylvania having plates ¼ inch thick and 27/32 inch thick like those of the failed tank, a wrapping on the order of ¼ inch thick of a composite material comprising glass fibers in a resin matrix will withstand all of the stresses that might be encountered. The filaments are wound around the shell continuously between the bottom and top of the shell helically at a small angle so that they are almost circumferential. The helicity is present only to permit the tank to be covered in a continuous wrapping. From a fracture preventing pointing of view, a perfectly circumferential orientation for the filaments would be ideal since failure of the tank occurs by the breaking of a hoop of indeterminate height and the consequent propagation of a fracture from the break to the top and bottom of the tank in directions parallel to the axis of the tank. Fractures will be prevented from initiating in tanks treated in the manner described above. The composite material supports the steel of the tank, reducing the stresses in the steel and providing an impermeable membrane. It is conceivable that the material of the shell can corrode through to the composite material, in which case a leak might develop, but it is believed that the reinforcing wrapping of composite material will prevent leakage from the tank. Even if some leakage were to occur, no fracture would propagate. As a result, there would be ample time to take measures to stop the leak with no danger of a tank burst. Thus, the only possible mode of failure of the tank would be by leak, rather than burst.

In applications where the loss of the fluid in the tank can be tolerated, such as where the tank stores water in a place presenting no danger to public safety, tanks can be reinforced with one or more discrete spaced circumferential bands of the composite material, further reducing the cost of preventing the bursting of fluid storage tanks. A fracture can initiate in a space on either side of the band or between bands, but its propagation will be stopped by the band either above the space and/or the band below the space. Even though a considerable outflow of fluid from the tank can occur through the limited fracture, the basic structural integrity of the tank will be maintained. The volume of the composite material in the bands is selected to be strong enough to withstand not only the stresses imposed on the shell by the force of the fluid in the tank and the additional stresses imposed on the shells by the conditions which cause the initiation of a fracture, but also the dynamic forces of the rapidly propagating fracture.

Although the present invention provides a solution to problems presented by existing fluid storage tanks, as described above, it also provides greater safety in the construction of new storage tanks of steel and other materials. New fluid storage tanks are built with steel that is tougher and more ductile than steels used decades ago. However, the steel can still contain undetected flaws which can result in a tank burst due to a rapidly propagating fracture. In addition, a bad job of welding the plates together can leave weaknesses which increase the stress on the shell and can cause a rapidly propagating fracture. Moreover, acts of sabotage, terrorism, or war can initiate rapidly propagating fractures. Propagating fractures in the tougher steel are more likely to be ductile fractures than brittle fractures, but propagating ductile fractures can be just as devastating.

BRIEF DESCRIPTION OF THE DRAWINGS

FIG. 1 is a perspective view of a large, reinforced storage tank according to the present invention having a continuous covering of composite material on its exterior surface;

FIG. 4 is a perspective view of another large, reinforced storage tank according to the present invention having spaced bands of composite material for stopping rapidly propagating fractures.

DETAILED DESCRIPTION OF THE PREFERRED EMBODIMENTS

Figure 2:
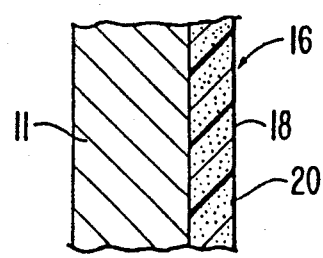
FIG. 2 is a cross section of a fragment of a tank shell reinforced in accordance with the present invention.

As can be seen from FIG. 1, a large, stationary fluid storage tank, which is designated by the reference numeral 10, is generally cylindrical and has a vertical axis. Such storage tanks are actually building structures, many of which have foundations and heights of several stories with a capacity to hold, for example, millions of gallons of liquid. The tanks usually have foundations of gravel or concrete, bottoms of steel plates, and roofs (none of which are shown) in addition to a cylindrical shell 11.

Tanks of the type for which the present invention is especially useful are made of a metal, especially steel, which is susceptible to failure under load by a rapidly propagating fracture, either brittle or ductile. The shell 11 is typically made of a plurality of curved steel plates 12 which are secured together along their edges in courses by welding, riveting, bolting or the like. The shell 11 is capable of withstanding the stresses, especially hoop stresses, imposed on it by the forces of the fluid in the tank. In liquid storage tanks, the courses of steel plates 12 are sometimes progressively smaller in thickness from the bottom to the top of the tank 10 since the loads on the plates at the bottom are greater than the loads on the plates at the top. The roofs are often supported by the cylindrical shell and vented by pipes to the exterior. In addition, ladders 14 are usually provided from the bottom to the top of the tanks 10 for inspection and maintenance purposes.

In order to prepare a tank for preventing bursting from a rapidly propagating fracture, the ladders 14 and other appurtenances are removed, the exterior of the plates 12 is shotblasted or sandblasted and primed with a coating for enhancing the adherence of a composite material 16 to the surface of the plates. Then, the composite material 16 is applied, and the ladders 14 and other appurtenances are reattached.

As can be seen from FIG. 2, the composite material 16 comprises a large plurality of fine, high tensile strength, lightweight nonmetallic filaments 18 which are wrapped helically around the exterior for the plates 12, in contact with the plates. Prior to wrapping, the filaments 18 are preferably grouped in rovings, each of which contains thousands of the filaments 18 having diameters less than 0.001 inch. The helical nature of the windings does not show up in the drawing figures, since the angle of the helix is small and the circumference of the tank 10 is very large. The filaments 18 are continuous, and a plurality of layers of the filaments are wound around the shell 11. Filaments 18 of glass are preferable because of their high tensile strength, low cost, light weight and non-corrodibility. There are different types of fiberglass having different tensile strengths and, although higher strength types, such as "S-2" fiberglass filaments, can be used, lower strength and far less expensive fiberglass filaments, such as E-type fiberglass filaments, can also be used. The use of other high-strength nonmetallic filaments, such as those made of the aramid material known as Kevlar or the polyester material known as Compet, is also acceptable.

The composite material 16 also includes a curable viscous resin 20 which defines a matrix for the filaments 18 and results in a homogeneous composite material 16. Thus, by the use of the resin 20, although a plurality of layers of filaments 18 are applied to the plates 12, the resultant reinforcing covering will include a plurality of windings of filaments in a continuous matrix. The resin 20 also causes the filaments 18 to adhere to the shell 11 and to one another. The filament material comprises approximately 50–70 percent of the composite material 16. Although a flexibilized isophthalic polyester resin is preferred, other resins, such as epoxy resin, are suitable. The resin 20 prevents the dirt and moisture from reaching the shell 11 of the tank 10 and thereby prevents corrosion In addition, the resin has a resilient nature which protects the shell from impacts from, for example, machinery operating near the tank 10.

As can be seen from FIG. 1, the composite material can be wrapped around substantially the entire exterior surface of the shell 11 to form a jacket surrounding and contacting the shell. The composite material 20 is wound to a thickness which will withstand the hoop stress imparted to the shell 11 by the fluid, such as the hydrostatic head in the case of a liquid, as well as the additional hoop stresses developed in the wall as a result of the presence of a flaw in the material or in the welding, or due to embrittlement, or a combination of these and other factors. Although the term "flaw" as used herein includes voids, recesses and cuts into the material, it is also intended to include embrittlement, corrosion and other defects which increase the stresses on the shell 11 of the tank 10. The thickness of the composite material 16 needed depends on the specific weight and height of the liquid stored. For most applications, where glass fibers or filaments 18 are used, a thickness on the order of $\frac{1}{4}$ inch is sufficient. Since the stresses on the shell 11 near the bottom will be greater than the stresses near the top (because the hydrostatic head decreases), the composite material 16 can be made thinner as the wrapping progresses from bottom to top.

Figure 3:
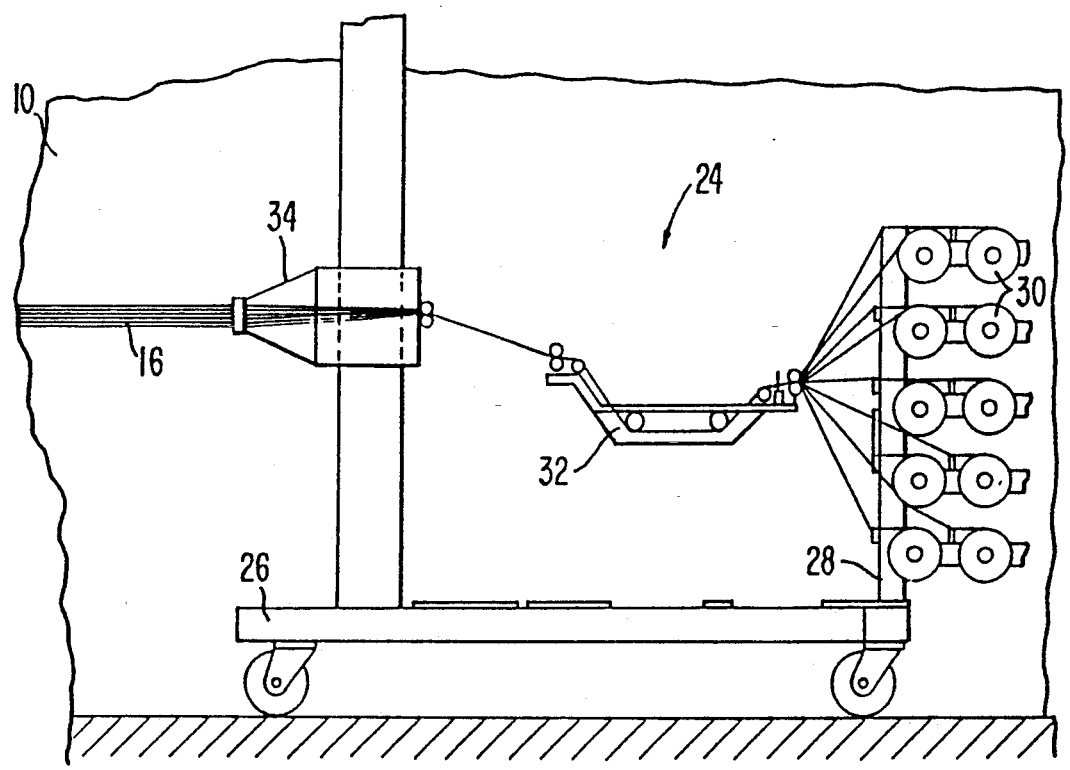
FIG. 3 is a schematic illustration showing the wrapping of composite material along the surface of a tank.

An apparatus 24 for applying the continuous filaments 18 around the circumference of the tank 10 is shown schematically in FIG. 3. The apparatus includes a wheeled carriage 26 having a rack 28 for carrying a plurality of coils 30 of the filaments 18 and devices or guiding the filaments 18 into a web of parallel filaments which is led through a bath 32 of the resin 20 and then applied to the surface of the shell 11. A distributor head 34, which is vertically movable relative to the carriage 26, is provided so that the filaments 18 can be wrapped in a helical manner. The filaments 18 can be wrapped around the tank 10 from bottom to top or top to bottom, and then reversed so that wrapping progresses in the opposite direction. The filaments 18 can be wrapped around the tank 10 from bottom to top or top to bottom, and then reversed so that wrapping progresses in the opposite direction. The filaments 18 are drawn from the center of the coils 30. The filament in each coil 30 has a tail at its exterior which is tied to the lead at the center of an adjacent coil 30. In this manner, winding of filaments 18 more than one coil long can be accomplished without stopping. The up and down helical wrapping continues until the desired thickness of composite material 16 is attained. Apparatus for applying filaments to a tank wall is well known, and an example is disclosed in U.S. Pat. No. 3,843,429 to W. B. Jessup.

The apparatus is operated such that the filaments 18 are applied with an insignificant or insubstantial tension, using only enough tension to keep the filaments 18 straight and untangled and to permit them to adhere, as a result of their resin coating, to the surface of the plates 12. The use of such little tension helps avoid breakage of the filaments 18 and avoids placing a prestress on the shell 11. Although the use of a resin bath 32 for coating the filaments 18 has been described, the resin 20 can also be applied by spraying or other techniques. The resin 20 is then cured with a catalyst, heat, ultraviolet light, or other known methods for curing resins. The composite material is very light, so that the tanks can be protected against bursting without the addition of a substantial weight load to the tanks. The lightness of the material also makes it easy to apply to the tanks.

A colorant can be added to the resin so that a composite material of a desired color will result, reducing later maintenance by eliminating the need for painting. As an alternative, the index of refraction of the resin can be made to match the index of refraction of the filaments, in the manner disclosed in U.S. Pat. No. 4,589,562 issued to the present inventor, so that the composite material is rendered transparent so as to reveal future damage or degradation and to display paint underneath, which can show a company name or logo.

As can be appreciated from FIG. 4, the composite material 16 can be applied in one or more discrete spaced circumferential bands 36. Although each of the bands 36 are circumferential, the filaments 18 within each of them are helical. When a web of the filaments 18 has been wound to the top or bottom level of a band 36, the direction of the helix is reversed and the web is wound helically back to the opposite edge of the band, and so on until the band 36 is wound to a volume such that it will stop a rapidly propagating fracture which might initiate in a space between the band 36 and one of the adjacent bands 36. Since each of the bands 36 must be able to stop a rapidly propagating fracture, they are sized to withstand not only the hoop stresses imposed on the shell 11 by the liquid and the stresses imposed by flaws in the shell, but also the dynamic forces of a rapidly traveling fracture. The volume of the composite material 16 needed to perform the fracture stopping function will depend on some of the same factors as the embodiment represented in FIG. 1. For most applications, bands 36 having a thickness on the order of $\frac{1}{2}$ inch and a height on the order of 10 inches is sufficient to stop any propagating fracture. Since the forces encountered near the top of the tank 10 are smaller than those encountered near the bottom, the size of the bands 36 can be diminished from the bottom of the tank to the top. As a result of the fracture stopping bands, the height of the tank 10 along which the fracture can propagate is limited so that the tank will not burst. The fracture can result in an opening through which the liquid can be lost at a considerable rate, but the tank will remain intact and will be repairable.

Although several preferred embodiments of reinforced tanks and the methods for making them have been specifically disclosed herein, it is apparent that a latitude of modification within the present invention is possible. For example, although the tanks have been discussed herein primarily in connection with liquids, it can be appreciated that the present invention can also be employed in connection with tanks storing gases under pressure. Furthermore, although the tasks illustrated herein are cylindrical, it is understood that the present invention is useful in reinforcing tanks of other shapes. Still other changes are possible which remain within the spirit and scope of the present invention, which is defined by the appended claims and their legal equivalents.

I claim:

1. A reinforced tank for storing fluid under loading conditions comprising:

a cylindrical shell strong enough to withstand stresses imposed on the shell by the fluid stored in the tank, said shell comprising a plurality of metal plates welded together, said shell having a vertical axis, an exterior surface, a top end and a bottom end, said shell being supported at its bottom end and being subject to bursting under load due to a rapidly propagating fracture from increased stresses in the shell above the stresses imposed by the fluid; and a reinforcing jacket of composite material extending around said shell and in contact with the exterior surface of said shell, said composite material defined by a plurality of continuous, high tensile strength, nonmetallic filaments wound around said shell and a resinous matrix for said filaments, wherein said composite material defines a plurality of spaced circumferential bands.

2. The reinforced tank of claim 1, wherein said filaments are under an insubstantial tension sufficient only to have permitted said filaments to be applied to the shell in an orderly manner.

3. The reinforced tank of claim 1, wherein the composite material is adhered to the shell.

4. The reinforced tank of claim 1, wherein the filaments are glass.

5. The reinforced tank of claim 1, wherein the resinous matrix is a cured resin.

6. The reinforced tank of claim 1, wherein the plates are made of steel.

* * * * *